United States Patent [19]
Zardi et al.

[11] Patent Number: 5,171,543
[45] Date of Patent: Dec. 15, 1992

[54] REACTOR FOR EXOTHERMIC HETEROGENEOUS SYNTHESIS REACTIONS

[75] Inventors: Umberto Zardi, Via Lucino 57, CH-6932 Breganzona; Giorgio Pagani, Lugano, both of Switzerland

[73] Assignees: Ammonia Casale S.A.; Umberto Zardi, both of Switzerland

[21] Appl. No.: 491,311

[22] Filed: Mar. 9, 1990

[30] Foreign Application Priority Data

Mar. 9, 1989 [CH] Switzerland .................. 00876/89

[51] Int. Cl.$^5$ .......................... B01J 8/04; C01C 1/04
[52] U.S. Cl. .................................. 422/148; 422/192; 422/194; 422/201; 422/218; 423/360
[58] Field of Search ............... 422/148, 194, 201, 192, 422/218; 423/360

[56] References Cited

U.S. PATENT DOCUMENTS

| | | | |
|---|---|---|---|
| 4,311,671 | 1/1982 | Notman | 422/148 |
| 4,904,453 | 2/1990 | Zardi | 422/148 |
| 4,952,375 | 8/1990 | Zardi | 422/148 |

FOREIGN PATENT DOCUMENTS 0376000 7/1990 European Pat. Off. .

*Primary Examiner*—Jill A. Johnston
*Attorney, Agent, or Firm*—Ostrolenk, Faber, Gerb & Soffen

[57] ABSTRACT

Synthesis gas is reacted in several catalytic beds having axial-radial or radial flow. Reacted gas is collected at an outlet of a final catalytic bed and is transferred to a reaction heat recovery system situated at a top of a reactor. The reactor includes three catalytic beds, two or more beds having inverted, curved bottoms. A first quenching system is located in the reactor and includes a distributor situated inside a first, upper bed at a location immediately under an unperforated portion of an internal wall of that bed. A gas/gas heat exchanger is located centrally within one or more of two upper beds located within the reactor. A water pre-heater or boiler is located inside an upper bottleneck portion of a shell of the reactor and is fed with reacted gas collected from a lowermost catalytic bed.

8 Claims, 1 Drawing Sheet

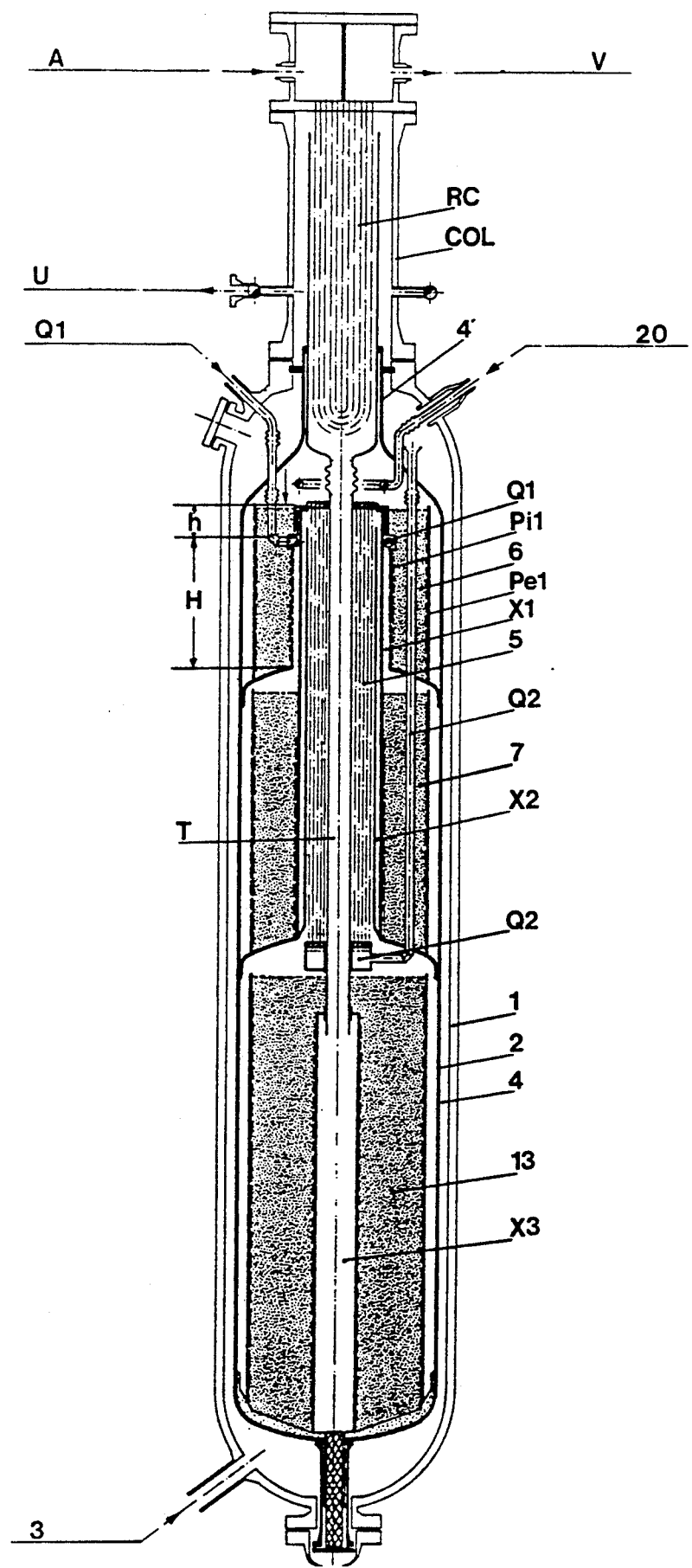

REACTOR FOR EXOTHERMIC HETEROGENEOUS SYNTHESIS REACTIONS

BACKGROUND OF THE INVENTION

1. Field of the Invention

This invention concerns a process for exothermic heterogeneous synthesis in which the synthesis gas flows over a series of catalytic beds superimposed but separate one from the other contained within the same reaction space, all the reacted gas collects in the central zone of the last lower catalytic bed and from here it flows upwards to the top of the space inside which its heat is exchanged and steam is produced.

The invention also concerns reactors to put this process into effect, consisting of a pressure-resistant external shell, of baskets of catalytic beds all inside the same shell, of a cartridge and of a heat exchanger.

2. Description of the Related Art

In a recent patent application it was pointed out that in ammonia production a remarkable amount of heat is developed in the synthesis reaction $N_2+3H_2$, which is generally recovered for the final purpose of producing steam recycled to reduce energy consumption.

The most advanced technology tends towards maximum recovery of said synthesis heat at the highest possible thermic level; synthesis units and their main component, the reactor, are therefore designed to this end.

The reactors used in new plants have several catalytic beds with intermediate quenching of the gas by means of indirect exchange through heat exchangers; moreover part of the reaction heat is removed with an external cooling fluid such as for example water feeding a boiler or by means of generating steam before the last reaction stage, and this for the purpose of being able to operate at the highest possible temperature (heat recovery at maximum thermic level) without any limitations of the greatest possible efficiency obtainable.

Maximum temperature and maximum yield are in fact contrasting needs as amply shown by the relevant diagrams which indicate in abscissa the concentration of ammonia and in ordinate the temperature of the gas.

Major synthesis reactor designers in general have favored reactors with several catalytic beds in at least two distinct parts in series, in order to satisfy the above-mentioned need for the optimal exchange of reaction heat (at the highest thermic level) without limiting the maximum yield obtainable (Fertilizer Focus October 1987). Where two distinct parts of equipment are adopted, the first of the two reaction devices generally contains two catalytic beds with indirect intermediate quenching with an internal heat exchanger, while the second one generally contains a single catalytic bed.

Heat exchange between the two parts of the installation is carried out by introducing a boiler to produce steam. This is the case with the Topsoe Series 250 (Series 200 + Series 50) reactor and with the Uhde reactor, both of them with radial flow of the gas in the catalytic beds (Fertilizer Focus October 1987, pages 36 and 39).

There are also reactors in three distinct parts, each part containing a catalytic bed with axial gas flow as found in the C.F. Braun design (Nitrogen Conference, Amsterdam 1986). In this case a steam-producing boiler is inserted between the second and the third part of the installation (Nitrogen Conference, Amsterdam 1986, Mr. K. C. Wilson, Mr. B. J. Grotz and Mr. J. Richez of CdF Chimie).

According to a recent patent by C. F. Braun (UK Patent Application 2132501A), the gas/gas exchanger between catalytic beds, usually conveniently situated inside the reactors with at least two beds inside a single installation, is situated outside the reaction apparatus directly connected to the bottom of the shell containing a single catalytic bed. To minimize the problems of pipes at a high temperature, the tube connecting the above horizontal exchanger with the shell containing the catalytic bed is quenched with the fresh gas fed to the reactor.

After having pre-heated the fresh feed gas, the gas leaving the catalytic bed leaves from the exchanger and feeds the device containing the second catalytic bed (C. F. Braun reactor with several reaction devices as shown in FIG. 5 of the Wilson, Grotz, Richez report of the above-mentioned reference and at page 48 of Fertilizer Focus, October 1987).

The problem solved in the C. F. Braun patent mentioned above, i.e. avoiding contact between high temperature gas and the tubes connecting shell and exchanger, does not affect reactors with several catalytic beds within a single piece of apparatus since, as described above, the gas/gas exchanger is inserted directly inside the reactor itself.

Even according to C. F. Braun the problem of optimal heat exchange is solved in a complex way by introducing a boiler connected by means of complex piping to the reactor itself (see FIG. 5 of the C. F. Braun presentation, Nitrogen '86 and Fertilizer Focus October 1987, page 48).

All the above plans, although resolving the thermodynamic problem, are very complex, hence very expensive. Ammonia synthesis reactors operate in fact at high pressure, generally not below 80 bar, and more often between 130 and 250 bar, and at a high temperature ($400° \div 500°$ C.). The connecting tubes for the various pieces of equipment necessary according to the drawings described above (as shown schematically in the above-mentioned references), operate under critical conditions (high temperature of the gas between the various reaction beds) and must therefore be made of special material and with long runs to minimize the mechanical stress resulting from thermic dilation. The situation is particularly complex in reactors according to C. F. Braun, in spite of the measures taken according to the C. F. Braun patent application, UK No. 2132501A.

In the above-mentioned UK patent application the Applicants have suggested a process and a reactor with several catalytic beds which do not suffer from the drawbacks described above, can be produced in a single piece, and permit the easy removal of reaction heat between catalytic beds, and more particularly before the last catalytic bed, so as to achieve maximum recovery of reaction heat at the highest thermic level, such heat being exchanged, for example, to pre-heat boiler water or to produce steam directly.

The hot gas reacted in the last catalytic bed but one is transferred, through a duct generally situated along the axis of the vertical reactor, directly to the heat exchange system (pre-heater or boiler), returning then directly to the reactor through a duct, either internal or external to the above-mentioned transfer duct, creating an airspace for the gas to run through, returning to the reactor, said gas feeding then directly the last catalytic bed with an axial-radial or radial flow either centrifugal or centripetal. Said gas, after reacting in the last catalytic bed, is transferred once again to the central or external part of the reactor, and leaves then from the bottom of the reactor.

This system works very well with reactors with a cylindrical shell with a substantially constant diameter, but would meet some difficulties with reactors having a graduated diameter shell.

SUMMARY OF THE INVENTION

Continuing in their research and experiments, the Applicants have now found that, especially when using and modernizing bottleneck-type reactors, it is advantageous to introduce the pre-heater or boiler inside said neck, collect the reacted gas in the central zone of the last bed, remove it and send it upwards axially and centrally to the top or neck where its heat is recovered.

BRIEF DESCRIPTION OF THE DRAWING

The drawing illustrates a reactor in accordance with the invention.

DETAILED DESCRIPTION OF THE PREFERRED EMBODIMENT

To facilitate comprehension of the system, subject of this invention, it is now described with reference to the illustration representing a cross-section by way of example of the converter according to a preferred embodiment of the invention.

The reactor consisting of shell (1) and of cartridge (2) forming the catalytic beds (in this case 3, namely 6, 7 and 13) is fed by the fresh gas (3) entering from the bottom of the reactor and running through from bottom to top of the airspace (4) between the shell (1) internal wall and the cartridge (2) external wall, for the purpose of reducing to a minimum the temperature of the shell.

As amply described in other patent applications by the Applicants, the synthesis gas leaving from the top of the airspace (4) runs with an axial flow through the smaller upper portion of the first bed (6) (defined by height "h", unperforated, of the internal wall Pi1), and with radial flow the greater portion defined by perforated height "H".

The gas reacted on the first bed (6) collects in the annular central zone X1 and from here goes to penetrate the second bed (7) through which it flows axially and radially.

The gas reacted on the second bed collects in internal annular zone X2. From here, after exchanging heat with fresh gas (Q2) in exchanger (5) it goes on to the third and last bed through which it flows both axially and radially collecting in zone X3. More particularly, the embodiment shown in the illustration is substantially of the type described and claimed in Swiss Patent Application No. 04551/88-8 of Sept. 12, 1988. It comprises, besides the three catalytic beds (6, 7 and 13), quenching Q1 at the top of the first bed and a heat exchanger (5) which is situated centrally through the first and second bed (6 and 7) and is fed with fresh gas Q2. As described in said patent application the bottoms of the two catalytic baskets (6 and 7) have an inverted curve as compared to the curve of the bottom of the third bed (13).

According to the main feature of this invention, the gas reacted on the third bed 13 collects in central space X3 and from here is sent through tube T to the upper end (COL) of shell (1), where the heat exchanger (RC) for said reacted gas is situated. RC can be a pre-heater for water (introduced for example from A) or a boiler generating steam (at a high level) leaving from (V).

Reacted gas exited the heat exchanger (RC) exits from the reactor from (V).

The upper end (COL) of (RC) is solid with the shell (1) of which it is an extension while the cartridge (2) is closed at 4' on the lower part of RC.

The structure of a reactor with boiler incorporated in the upper part of the reactor has proved in itself (not unsurprisingly) the ideal solution to achieve maximum heat recovery in new high-yield reactors. The same solution has proved a winner when modernizing in situ the more reliable and generally used old reactors still in operation at the present time, i.e. Kellogg bottleneck type reactors. It has been found that with a few marginal modifications old-type reactors with high energy consumption can be transformed in situ into high-yield and minimum energy consumption reactors with axial-radial flow such as for example the reactors according to U.S. Pat. Nos. 4,372,920 and 4,405,562 by the Applicants carrying out their modernization in situ according to the system found in U.S. Pat. No. 4,755,362, again by the Applicants.

In carrying out the transformation according to this invention, the typical outline of the Kellogg bottleneck reactor is maintained; inside the reactor three catalytic beds (6, 7 and 13) are introduced with quenching (Q1) and an exchanger (5) (alternatively, two exchangers), a boiler (for example a bayonet or hairpins type) is installed in the neck (COL), the width dimensions of the old and bulky Kellogg reactor (for example ID=2946 mm) are maintained, and reversed bottoms are given to the first two beds to achieve maximum pressure and efficiency of the catalyst with a small granulometry.

By way of example, it has been found that with a reactor according to this invention, with a capacity of 1000 MTD, at a pressure of 140 bar abs, feed gas at 218° C. and a volume of catalyst (with granulometry between 1.5 and 3 mm) of 70 m3, heat recovery in the pre-heater BFW and in the boiler (RC) can be achieved of 634'000 Kcal/MT of ammonia (equal to a production of about 1170 kg/MT of steam at 110 ata, starting from BFW at 105° C.

As indicated above, together with the advantages resulting from heat recovery there is also the further advantage arising from the possibility of being able to maintain the configuration and layout of bottleneck reactors, well known for their simplicity, reliability, efficiency and low costs.

Although the present invention has been described in connection with a preferred embodiment thereof, many other variations and modifications will now become apparent to those skilled in the art without departing from the scope of the invention. It is preferred therefore, that the present invention not be limited by the specific disclosure herein, but only by the appended claims.

We claim:

1. A reactor for exothermic, heterogeneous synthesis wherein synthesis gas flows through a plurality of catalyst beds located within the rector, the beds being superimposed but separate, comprising:
   a pressure-resisting outer shell;
   a plurality of baskets containing the catalyst beds, the baskets being located and superimposed within the shell;
   means for collecting hot reacted gas, the collecting means being located at a lower end of the shell inside a lowermost catalyst bed;

means for transferring the collected hot reacted gas centrally through the shell to an upper end of the reaction space located above an upper most catalyst bed;

a first heat exchanger located in the upper end of the shell for recovering heat from the collected hot reacted gas, the heat exchanger comprising a boiler for generating stem;

means for introducing quench gas into the reactor;

a second heat exchanger connected to the quench gas introducing means and located within the uppermost catalyst bed for exchanging heat between the quench gas and hot reacted gas exiting a catalyst bed superimposed between the uppermost catalyst bed and the lowermost catalyst bed; and means for removing the reacted gas from the reactor.

2. The reactor of claim 1, further comprising a cartridge located within the shell for containing the baskets.

3. The reactor of claim 1, wherein three baskets are located within the shell, two of the three baskets having inversely curved bottoms.

4. The reactor of claim 1, wherein the quench gas introducing means comprises a distributor.

5. The reactor of claim 1, further comprising an annular central zone located within the uppermost catalyst basket, the annular central zone being in fluid communication with the quench gas introducing means for receiving the quench gas.

6. The reactor of claim 1, wherein the means for centrally transferring the hot reacted gas is a tube.

7. The reactor of claim 1, wherein the shell comprises a major cylindrical portion having a constant diameter for containing the catalyst baskets and a minor portion having a diameter smaller than the diameter of the major portion for containing the heat exchanger.

8. The reactor of claim 7, wherein the minor portion has a bottleneck shape.

* * * * *